United States Patent Office 3,122,505
Patented Feb. 25, 1964

3,122,505
BEARING COMPOSITION
Robert Rulon-Miller and Saul Ricklin, Bristol, R.I., assignors to Dixon Corporation, a corporation of Rhode Island
No Drawing. Filed Apr. 11, 1961, Ser. No. 102,104
23 Claims. (Cl. 252—12)

This application is a continuation-in-part of our applications, Serial No. 775,713, filed November 24, 1958, which was a continuation of our application Serial No. 573,633, filed March 26, 1956, which was a continuation of our application Serial No. 478,500, filed December 29, 1954, all applications being now abandoned.

This invention relates to a composition of matter of the type more particuarly useful for sliding surfaces such as a bearing where a considerable pressure is applied through the bearing, an instance of which would be a bearing for the top roll of a spinning frame, which top roll is weighted.

Bearings of this character were originally formed of metal. It is desired that there be no lubricant used for certain bearings, such as are used for the top roll of a spinning frame, as the textile material upon which the roll operates may become stained or damaged by such lubricant, and accordingly some materials other than metal have been attempted. We are familiar with the use of Teflon, which is polytetrafluoroethylene, a material which is the subject of U.S. Patent No. 2,230,654, dated February 4, 1941. We have found that this material has poor wear resistance and is unsuitable for use as a bearing where considerable weights are applied. We are also familiar with the use of Teflon in which there has been mixed particles of a silicate such as mica, talc, aluminum silicate or glass, which is the subject matter of patent application of one of the joint inventors hereof, Serial No. 617,719, filed October 23, 1956, which is a continuation-in-part of Serial No. 306,845, filed August 26, 1952, now abandoned, and which gives some improved results over the use of Teflon alone.

One of the objects of this invention is to further improve upon the composition of matter of two materials, which is the subject of the last application above mentioned.

A more specific object of the invention is to provide a composition which will better withstand wear in an unlubricated bearing which is subjected to pressure loads.

Another object of the invention is to reduce the co-efficient of friction of an unlubricated bearing material which is subjected to loads.

Polytetrafluoroethylene when molded into the form desired has a very smooth and slippery or greasy feel to the hand and provides an excellent low co-efficient of friction. When used alone, however, it has very low wear resistance to abrasion and will not stand up as a bearing under load, such for instance as the weighting of a top roll for a spinning frame. Glass particles such as fibers or powders are usually considered abrasive and are not often thought of in connection with use in a bearing. However, we have discovered that by placing small particles of glass or other silicate such as mica, aluminum silicate or talc in polytetrafluoroethylene the resistance to abrasion is increased and further found that if, together with any one of the selected silicates, small particles of some metal or metal oxides are used with polytetrafluoroethylene (Teflon) and dispersed through the Teflon, the resistance to abrasion is further materially increased, the co-efficient of friction is reduced, and the bearing will stand up under pressures developed in its use as the top roll bearing for a spinning frame or for other uses where pressure on the bearing is used.

The metal or metal oxide is used in place of a part of the silicate rather than being substituted for Teflon. Generally speaking, the polytetrafluoroethylene is present by volume in from 50 percent to 80 percent with a preferred smaller range of from 65–75 percent with the remainder of the material having substantially one part of metal or metal oxides to two parts of a silicate such as glass, talc, aluminum silicate, or mica, ranging to equal parts of the metal or metal oxide and silicate.

The silicates, glass, talc, aluminum silicate, and mica, are not equivalents but each when used with polytetrafluoroethylene is improved when a metal or metal oxide is used with the particular silicate selected to be incorporated in the polytetrafluoroethylene rather than the use of the two materials of Teflon and silicate.

The glass is usually in the form of glass fibers milled about $\frac{1}{32}$ of an inch long, or they may be ground glass or in the form of spheres or beads. The glass fibers are prepared by burning off any lubricant or resin on the fibers, which requires heating the glass fibers to about 600° F. The metal or metal oxides are prepared by grinding or pulverizing a metal or its oxides and thoroughly cleaning the same.

The mica is wet ground to 500 mesh. The talc is in the grade which may be purchased on the market as "Lo Micron" and the aluminum silicate is used in a grade which may be purchased on the market as Fiberfrax—Grade S, from Carborundum Company.

The selected quantity of Teflon with parts of pulverized silicate material and pulverized metal or metal oxide are mixed together at room temperature and tumbled to get a fairly uniform mixture. This mixture then goes into a pulverizing machine to grind and further mix the Teflon, silicate, and metal or metal oxide. An alternate method is to add the silicate and metal or metal oxide to an aqueous suspension of the Teflon and disperse them by agitation. The solids may then be precipitated by the addition of a non-aqueous solvent such as acetone, while stirring. The uniform mixture obtained is filtered, washed and dried at about 200° F., providing a putty-like homogeneous material suitable for molding.

The material formed by either of the above methods is placed in the top of an extrusion die. An air-operated ram forces a charge of the powder down into the die or mold. This ram operation is repeated. The charge reaches an externally heated portion of the mold and is there sintered at about 700° F. After passing the heated portion of the mold, the material is cooled enough by a draft of air to shrink it to the desired size and shape. It has been found that Teflon charged with the silicate and metal or metal oxide does not shrink nearly as much as Teflon alone. After shrinkage is complete, the rod-like material is forced out of the die or mold and cut into the proper lengths. The above is where a number of bearings are continuously formed in rod-like fashion and then cut off, but powder may be placed in a mold shaped for a single bearing. The mold must be of a size larger than the finished size in order that shrinkage may be allowed for. A pressure of 2,000 pounds per square inch or more is put on the powder to make it cling together in the form of a bearing. The powder thus formed may then be placed on a pan and be put into an oven where the material is heated up to about 700° F. To heat the material for a bearing of the size about $\frac{1}{2}''$ x $\frac{1}{2}''$, the heat will be continued for about an hour until the substance becomes translucent. It is possible to take the hot bearings from the oven and force them into different molds of the correct size and then chill them all quickly. This will produce the proper size uniformly solid bearing, and the co-efficient of friction will be lowered.

EXAMPLES

The following tests were run on pellets 5/8 x 3/16 x 1/8 inch on 1 inch water cooled shaft at 425 r.p.m. with a load of 2.9 pounds. Pellets were made by mixing Teflon and fillers in a MicroPulverizer, pressing in a mold and sintering. Data below represent the average weight loss for duplicate pellets after 72 hours. Filler percentages are reported by volume percent.

*Table No. 1*

| | Item No. | Percent Teflon | Percent Silicate | Percent Metal | Percent Metal Oxide | Percent Weight Loss |
|---|---|---|---|---|---|---|
| Group "A" | 1 | 70 | 30 Glass | | | 1.1 |
| | 2 | 70 | 30 Mica | | | 3.4 |
| | 3 | 70 | 30 Talc | | | 6.3 |
| | 4 | 70 | 30 Fiberfrax [1] | | | 10.2 |
| Group "B" | 5 | 70 | | 30 Copper | | 3.3 |
| | 6 | 70 | | 30 Molybdenum | | [2] 4.4 |
| | 7 | 70 | | 30 Lead | | [2] 26.7 |
| | 8 | 70 | | | 30 Red Lead | [2] 8.7 |
| | 9 | 70 | | | 30 Copper Oxide | [2] 20.8 |
| | 10 | 70 | | 30 Aluminum | | 18.5 |
| | 11 | 70 | | 30 Silver | | 14.8 |
| Group "C" | 12 | 70 | 19 Glass | 11 Copper | | .5 |
| | 13 | 70 | do | 11 Molybdenum | | .2 |
| | 14 | 70 | do | 11 Lead | | .3 |
| | 15 | 70 | do | | 11 Red Lead | .1 |
| | 16 | 70 | do | | 11 Copper Oxide | .6 |
| | 17 | 70 | do | 11 Silver | | 0.7 |
| | 18 | 70 | do | 11 Aluminum | | 0.7 |
| | 19 | 70 | 19 Mica | 11 Copper | | 1.5 |
| | 20 | 70 | do | 11 Molybdenum | | .3 |
| | 21 | 70 | do | 11 Lead | | 1.3 |
| | 22 | 70 | do | | 11 Red Lead | 1.8 |
| | 23 | 70 | do | | 11 Copper Oxide | 2.2 |
| | 24 | 70 | do | 11 Silver | | 1.4 |
| | 25 | 70 | do | 11 Aluminum | | 1.5 |
| | 26 | 70 | 19 Talc | 11 Copper | | 1.3 |
| | 27 | 70 | do | 11 Molybdenum | | .1 |
| | 28 | 70 | do | 11 Lead | | 1.1 |
| | 29 | 70 | do | | 11 Red Lead | 3.5 |
| | 30 | 70 | do | | 11 Copper Oxide | .7 |
| | 31 | 70 | do | 11 Silver | | 3.6 |
| | 32 | 70 | do | 11 Aluminum | | 2.8 |
| | 33 | 70 | 19 Fiberfrax [1] | 11 Copper | | 7.0 |
| | 34 | 70 | do [1] | 11 Molybdenum | | .57 |
| | 35 | 70 | do [1] | 11 Lead | | .49 |
| | 36 | 70 | do [1] | | 11 Red Lead | 1.4 |
| | 37 | 70 | do [1] | | 11 Copper Oxide | 4.4 |
| | 38 | 70 | do [1] | 11 Aluminum | | 2.3 |
| | 39 | 70 | do [1] | 11 Silver | | 0.2 |

[1] Fiberfrax is the trade name for aluminum silicate.
[2] These wore so badly that they had to be removed before 72 hours. Item 6 ran 24 hours; Item 7 ran 7 hours; Item 8 ran 24 hours; Item 9 ran 5 hours.

*Table No. 2*

| Percent Teflon | Percent Silicate | Percent Metal | Percent Metal Oxide | Percent Weight Loss |
|---|---|---|---|---|
| 50 | 50 Glass | | | 1.8 |
| 50 | 50 Mica | | | 4.8 |
| 50 | 25 Glass | | 25 Red Lead | 0.57 |
| 50 | 25 Mica | 25 Molybdenum | | 0.16 |
| 50 | do | | 25 Red Lead | 0.87 |
| 50 | 25 Fiberfrax | 25 Molybdenum | | 0.91 |
| 50 | 25 Glass | 25 Silver | | 0.8 |
| 50 | 25 Mica | do | | 1.5 |
| 80 | 20 Glass | | | 1.5 |
| 80 | 20 Mica | | | 4.4 |
| 80 | 20 Talc | | | 7.2 |
| 80 | | 20 Copper | | 4.3 |
| 80 | | 20 Lead | | 29.3 |
| 80 | | | 20 Red Lead | 11.3 |
| 80 | 10 Glass | 10 Lead | | .9 |
| 80 | do | | 10 Red Lead | .4 |
| 80 | do | 10 Copper | | .7 |
| 80 | 10 Mica | 10 Lead | | 1.7 |
| 80 | do | | 10 Red Lead | 2.4 |
| 80 | do | 10 Copper | | 2.0 |
| 80 | 10 Talc | 10 Lead | | 1.5 |
| 80 | do | | 10 Red Lead | 4.6 |
| 80 | do | 10 Copper | | 1.7 |
| 80 | 10 Glass | 10 Silver | | 1.1 |
| 80 | 10 Mica | do | | 1.5 |
| 80 | 10 Fiberfrax | do | | 0.8 |

From the above tables, it will be apparent that the use of a selected percentage of Teflon within the range of 50 to 80% above set forth and one other material either a silicate, metal, or metal oxide has a much greater wear than if the same percentage of Teflon is used with a silicate and a metal or metal oxide. From the examples also it will be noted that the silicate and metal oxide may be in equal percentages by volume or the silicate may be in substantially twice the volume as the metal or metal oxide, and in each one of these situations, the Teflon with the two ingredients, that is, a silicate and metal or metal oxide, is superior in resistance to wear than either the Teflon used with just the silicate or just the metal or metal oxide.

Thus, it will be noted in Table I that item 1 would be comparable with items 12 to 18, while item 2 would be comparable with items 19 to 25, item 3 would be comparable with items 26 to 32 and item 4 would be comparable with items 33 to 39.

We claim:
1. A bearing for a relatively moving surface consisting essentially of a homogeneous mixture of the three components polytetrafluoroethylene present by volume of 50% to 80%, a silicate selected from the group consisting of glass, talc, mica and aluminum silicate and a third material selected from the group consisting of aluminum, molybdenum, silver, copper, lead, lead oxide and copper oxide, the silicate being present by volume in from equal parts to twice the third material, whereby the presence of the third material imparts increased wear resistance as compared with a two part mixture of polytetrafluoroethylene wherein the silicate or third material would be present in amount equal to the sum of the silicate and the third material in the three part mixture.

2. A bearing for a relatively moving surface consisting essentially of a homogeneous mixture of the three components polytetrafluoroethylene present by volume of 50% to 80%, glass and a third material selected from the group consisting of aluminum, molybdenum, silver, copper, lead, lead oxide and copper oxide, the glass being present by volume in from equal parts to twice the third material, whereby the presence of the third material imparts increased wear resistance as compared with a two part mixture of polytetrafluoroethylene wherein the glass or third material would be present in amount equal to the sum of the glass and the third material in the three part mixture.

3. A bearing for a relatively moving surface consisting essentially of a homogeneous mixture of the three components polytetrafluoroethylene present by volume of 50% to 80%, talc and a third material selected from the group consisting of aluminum, molybdenum, silver, copper, lead, lead oxide and copper oxide, the talc being present by volume in from equal parts to twice the third material, whereby the presence of the third material imparts increased wear resistance as compared with a two part mixture of polytetrafluoroethylene wherein the talc or the third material would be present in amount equal to the sum of the talc and the third material in the three part mixture.

4. A bearing for a relatively moving surface consisting essentially of a homogeneous mixture of the three components polytetrafluoroethylene present by volume of 50% to 80%, mica and a third material selected from the group consisting of aluminum, molybdenum, silver, copper, lead, lead oxide and copper oxide, the mica being present by volume in from equal parts to twice the third material, whereby the presence of the third material imparts increased wear resistance as compared with a two part mixture of polytetrafluoroethylene wherein the mica or the third material would be present in amount equal to the sum of the mica and the third material in the three part mixture.

5. A bearing for a relatively moving surface consisting essentially of a homogeneous mixture of the three components polytetrafluoroethylene present by volume of 50% to 80%, aluminum silicate and a third material selected from the group consisting of aluminum, molybdenum, silver, copper, lead, lead oxide and copper oxide, the aluminum silicate being present by volume in from equal parts to twice the third material, whereby the presence of the third material imparts increased wear resistance as compared with a two part mixture of polytetrafluoroethylene wherein the aluminum silicate or the third material would be present in amount equal to the sum of the aluminum silicate and the third material in the three part mixture.

6. A bearing as in claim 1 wherein polytetrafluoroethylene is present by volume in a range of 65–75%.

7. A bearing as in claim 2 wherein polytetrafluoroethylene is present by volume in a range of 65–75%.

8. A bearing as in claim 3 wherein polytetrafluoroethylene is present by volume in a range of 65–75%.

9. A bearing as in claim 4 wherein polytetrafluoroethylene is present by volume in a range of 65–75%.

10. A bearing as in claim 5 wherein polytetrafluoroethylene is present by volume in a range of 65–75%.

11. A bearing as in claim 1 wherein polytetrafluoroethylene is present in 70% by volume.

12. A bearing as in claim 1 wherein polytetrafluoroethylene is present in 70% by volume and the silicate is present by volume in 19% and the third material is present by volume in 11% whereby the presence of the third material imparts increased wear resistance as compared with a two part mixture of polytetrafluoroethylene wherein the silicate or the third material would be present in amount equal to the sum of the silicate and third material in the three part mixture.

13. A bearing as in claim 12 wherein the silicate is glass.

14. A bearing as in claim 12 wherein the silicate is talc.

15. A bearing as in claim 12 wherein the silicate is mica.

16. A bearing as in claim 12 wherein the silicate is aluminum silicate.

17. A bearing as in claim 12 wherein the third material is lead.

18. A bearing as in claim 12 wherein the third material is lead oxide.

19. A bearing as in claim 12 wherein the third material is aluminum.

20. A bearing as in claim 12 wherein the third material is molybdenum.

21. A bearing as in claim 12 wherein the third material is silver.

22. A bearing as in claim 12 wherein the third material is copper.

23. A bearing as in claim 12 wherein the third material is copper oxide.

References Cited in the file of this patent

UNITED STATES PATENTS

| | | |
|---|---|---|
| 2,400,091 | Alfthan | May 14, 1946 |
| 2,400,099 | Brubaker et al. | May 14, 1946 |
| 2,685,707 | Llewellyn et al. | Aug. 10, 1954 |
| 2,691,814 | Tait | Oct. 19, 1954 |
| 2,715,617 | White | Aug. 16, 1955 |
| 2,824,060 | White | Feb. 18, 1958 |